United States Patent

[11] 3,566,144

[72] Inventor James L. Rodgers
Tempe, Ariz.
[21] Appl. No. 705,144
[22] Filed Feb. 13, 1968
[45] Patented Feb. 23, 1971
[73] Assignee Motorola, Inc.
Franklin Park, Ill.

[54] CODE SEQUENCE DETECTION
5 Claims, 4 Drawing Figs.

[52] U.S. Cl. .... 307/232, 307/218, 307/252, 328/119, 329/112
[51] Int. Cl. .... H03k 5/20
[50] Field of Search .... 328/119, 109, 110; 329/112; 307/206, 218, 232, 238, 252, 305

[56] References Cited

UNITED STATES PATENTS

| | | | |
|---|---|---|---|
| 3,040,259 | 6/1962 | Groudan et al. | 328/119X |
| 3,265,974 | 8/1966 | Thomas | 328/119X |
| 3,399,351 | 8/1968 | Reszka | 328/119 |

OTHER REFERENCES

RCA Technical Notes No. 495 September 1961 "A Sequence Tone Reed Decoding System" by R.F. Sanford

*Primary Examiner*—Donald D. Forrer
*Assistant Examiner*—John Zazworsky
*Attorney*—Aichele and Mueller

ABSTRACT: A three input decoding circuit including a thyristor actuated to an active current conducting condition by the three inputs when in a predetermined signal state. The thyristor remains in its active condition after the second input signal state is changed. An output signal is supplied through a transistor whenever the thyristor is in its conducting active condition, and the second input signal has been changed and the third input signal remains in the predetermined state.

INVENTOR.
JAMES L. RODGERS
BY
Mueller, Aichele & Rauner
ATTORNEYS

CODE SEQUENCE DETECTION

BACKGROUND OF THE INVENTION

This invention relates to code sequence detectors and particularly to such detectors usable with a three input code.

Command devices often utilize a sequence of tones or other form of digital signals to remotely actuate various functions. Various tone sequences or digital code sequences can be utilized for security purposes and for insuring proper operation of the devices being controlled. The detection of such sequences often requires elaborate detection circuitry.

For the purpose of brevity, a digital signal or tone is defined as being "ON" when in a first signal state, i.e., relatively positive, and of being –OFF" or "no signal" when in a second signal state, i.e., relatively negative, or at a reference potential.

SUMMARY OF THE INVENTION

It is an object of the present invention to provide a simple digital code sequence detector circuit.

This invention features a digital signal sequence of signal No. 1 on, signal No. 2 on, signal No. 2 off, and signal No. 3 on, is utilized. Six combinations of such a sequence are provided by interchanging input connections.

A first AND circuit having memory capabilities is actuated when signal No. 1 and signal No. 2 are on and signal No. 3 is off. Removal of signal No. 2 does not affect the output of the AND circuit because of its memory capability. A second AND circuit is jointly responsive to the output signal of the first AND circuit, to the second signal being off and the third signal being "on" to supply a unique output signal. At other times, or upon the detection of other code sequences, a different output signal is supplied.

In one embodiment of the invention a thyristor has its anode connected to the first signal input and its cathode connected to a third signal input. When a second signal input is applied to the gate electrode, the thyristor begins to conduct current and maintains current conduction even though the second signal is removed or turned "off." In the output circuit, a transistor has its emitter electrode connected through a diode to the cathode of the thyristor. The transistor is made conductive when the second signal is turned off and the third signal is still "on" to supply a current through an output terminal. At all other times a high impedance state is presented to the terminal, thereby indicating that no unique signal sequence has been detected.

THE DRAWINGS

DESCRIPTION OF THE ILLUSTRATIVE EMBODIMENT

Figure 1:
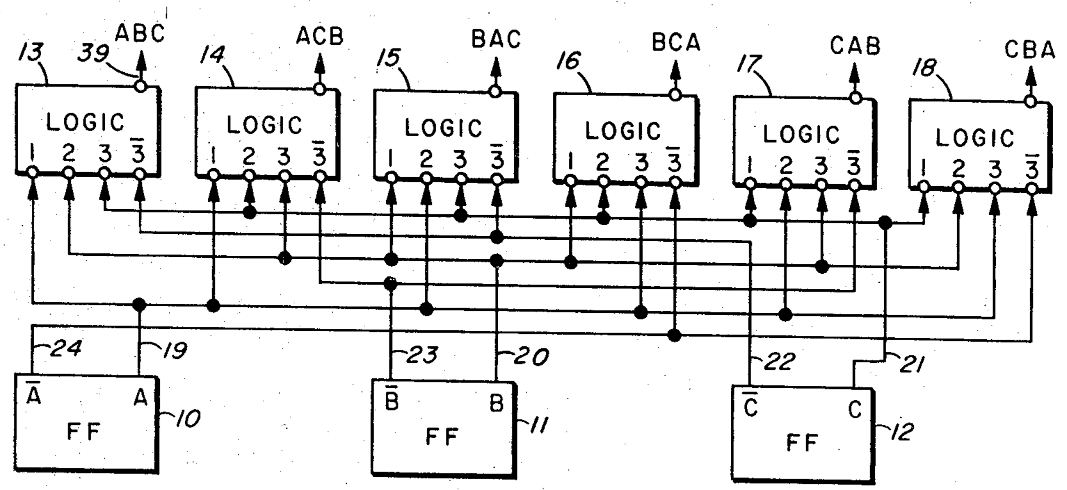
FIG. 1 is a block diagram of a decoder utilizing the teachings of the present invention.
Figure 2:
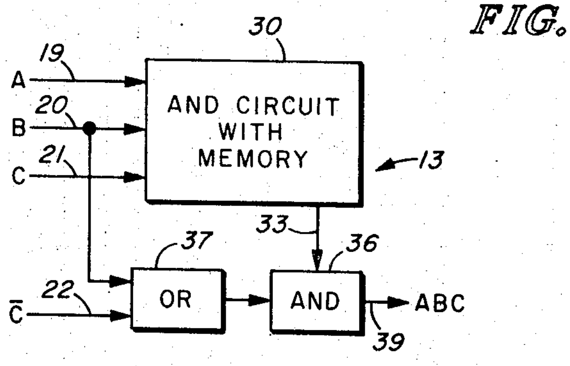
FIG. 2 is a logic flow diagram of a decoding circuit usable in the FIG. 1 decoder.
Figure 4:
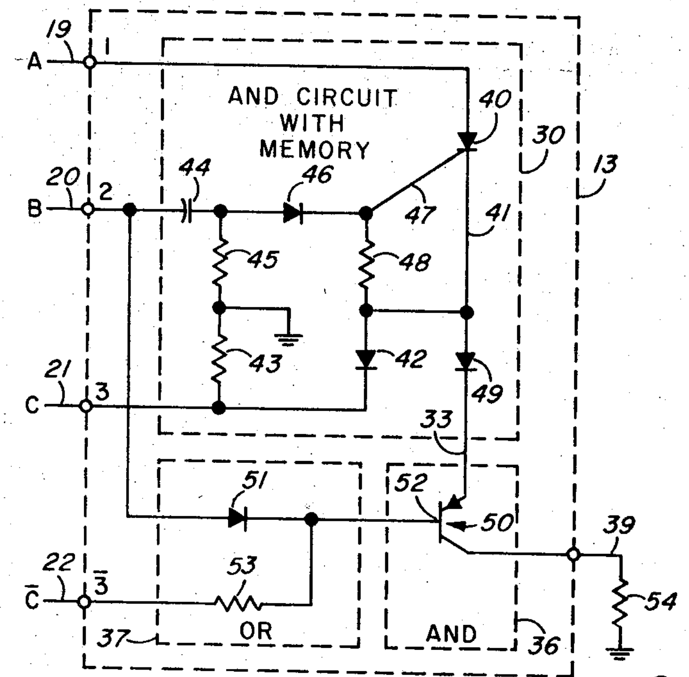
FIG. 4 is a schematic diagram of one construction of the FIG. 2 illustrated circuit.

With reference to the attached drawing, like numbers indicate like parts and structural features in the various diagrams. Three flip-flops, 10, 11, and 12, are successively set to their respective active conditions by means (not shown) to provide a sequence of signals denoted A, B, and C, respectively, over pairs of signal lines 19, 20; 21, 22; and 23, 24 to logic decoding elements 13, 14, 15, 16, 17, and 18. Each signal line pair carries complementary digital signals. For example, when flip-flop 10 is set to its active condition (binary 1 stored), line 19 has a relatively positive signal while line 24 has a relatively negative signal; when flip-flop 10 is reset to its inactive condition (a binary 0 stored), line 24 has a relatively positive signal while line 19 has a relatively negative signal. Complementary signals indicate that one of the lines in each pair of lines has a signal opposite that of the other line, i.e., positive and negative; tone or no tone, etc. Each of the logic elements 13 through 18 is constructed as shown in FIGS. 2 and 4 and have unique input connections from the three flip-flops 10 through 12. Each logic module is designed to detect a predetermined code sequence from the three flip-flops. For example, logic module 13 detects the sequence AB$\overline{B}$C, i.e., flip-flop 10 is first set at its active condition then flip-flop 11 is set at its active condition, flip-flop 11 is reset to an inactive condition and then flip-flop 12 is set to its active condition. Logic module 14 detects sequence AC$\overline{C}$B, etc. as indicated in FIG. 1.

Each of the logic modules has four input terminals. The first and second inputs receive two simultaneously occurring signals. The signal to the first terminal should arrive before or with the signal to the second input terminal. Input No. 1 is for a first signal in a sequence of code signals, i.e., the A flip-flop, when set to its active condition, supplies a signal to input 1 of logic module 13. Input No. 2 is for receiving the second signal in a sequence of signals. Logic module 13 has a second input connected over line 20 to the 1 or active condition output of flip-flop 11. The third and fourth input connections receive the third signal in the sequence. Such third and fourth inputs are of a complementary type such that when input 3 has a relatively positive voltage thereon, input 4, indicated by 3, has a relatively negative voltage thereon, and vice versa. Such input connections may receive any one of the three signals A, B, or C to arbitrarily establish a code sequence to be detected.

Referring next to FIG. 2, logic module is illustrated in logic flow diagram form. Input lines, 19, 20 and 21, which respectively carry the active conditions or set signals, A, B, and C from flip-flops 10, 11 and 12 are connected to "AND circuit with memory" 30. Circuit 30 is jointly responsive to the signals A, B, and C on lines 19, 20 and 21 to establish a first current conductive state for supplying current over line 33, otherwise circuit 30 maintains a second current conductive state of zero current amplitude. The output portions of logic module 13 consist of AND circuit 36 and OR circuit 37. OR circuit 37 receives a B signal from line 20 from flip-flop 11 and a $\overline{C}$ signal over line 22 from the complementary output side of flip-flop 12. Either the B signal or $\overline{C}$ signal being relatively positive, causes OR circuit 37 to supply a positive signal to AND circuit 36; only if both the B and $\overline{C}$ signals are negative will a negative or actuating signal be supplied to AND circuit 36. OR circuit 37 may also be considered as a negative signal AND circuit. AND circuit 36 is jointly responsive to a positive potential on line 33 and a negative signal from OR circuit 37 to supply electrical current as an output signal over line 39. At all other times a no current signal is supplied, transistor 50 being in a high impedance state or current nonconduction.

Figure 3:
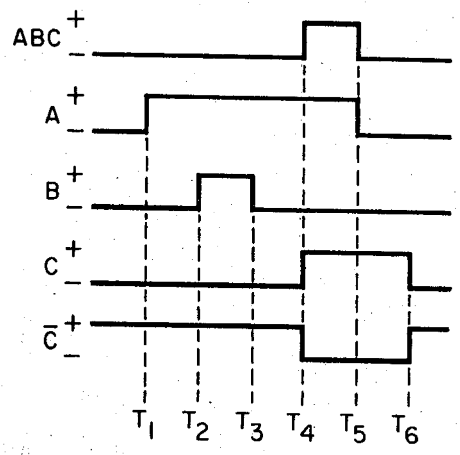
FIG. 3 is a set of idealized digital signal waveforms used to explain the operation of the FIG. 2 circuit.

Details of logic module 13 circuitry are shown in FIG. 4 with the operation explained with reference to the idealized waveforms of FIG. 3. "AND circuit with memory" 30 consists of silicon controlled rectifier or thyristor 40 having its anode electrode connected to input terminal 1 which in module 13 is line 19. Gate electrode 47 is connected through diode 46 and capacitor 44 to input 2 or line 20. Capacitor 44 provides an AC connection between input 2 and the gate electrode such that a transistory signal is sufficient to actuate circuit 30. The cathode of SCR 40 is connected over line 41 through diode 42 and input 3 to line 21. As is known, the anode and cathode are in the main current path through the thyristor. Resistors 45 and 48 are bias resistors while resistor 43 provides a path for thyristor 40 current prior to actuation of AND circuit 36.

At time $T_1$ a positive signal is supplied over line 19 to the anode of thyristor 40; with "no signal" on line 21, i.e., C signal is off or relatively negative, a potential exists across thyristor 40. At time $I_2$ the B signal is received over line 20 and supplied through capacitor 44 to gate electrode 47 switching thyristor 40 to its current conducting state. It is well known that when thyristor 40 begins current conduction it remains conducting so long as an appropriate potential difference exists between its anode and cathode and in this manner provides a memory function. At time $I_3$ the B signal is removed, making line 20 relatively negative and line 22 relatively positive.

It is remembered that the desired sequence is A on, B on; then B off and C on. Signal B is turned off at time $T_3$ while signal C is turned on at $T_4$. At time $T_4$ line 21 becomes relatively positive thereby making the potential of line 21 equal to the potential of line 19 which blocks current flow through diode 42. To maintain current conduction through thyristor 40, transistor 50 of AND circuit 36 must immediately become current conductive. At time $T_4$ line 22 receives the relatively negative complementary signal ($\overline{C}$) of signal C. Such negative signal is supplied through resistor 53 to base electrode 52 of transistor 50 to immediately bias transistor 50 to current conduction. Current from thyristor 40 then flows through diode 49, thence transistor 50, and over output line 39 to load 54. Transistor 50 base current flows from thyristor 40 to line 22.

Isolation diode 51 prevents signal $\overline{C}$ from being passed from base electrode 52 to line 20. Resistor 53 also isolates line 22 from the internal operation of OR circuit 37. Prior to $T_3$, the relatively positive signal B on line 20 supplied through diode 51 keeps transistor 50 nonconductive, thereby establishing the criterion that signal B be removed prior to application of signal C to module 13.

To extinguish thyristor 40 at time $T_5$, signal A is removed from line 19. This action also removes the output current conductive signal on line 39. Signal C may be simultaneously removed or may be subsequently removed at time $T_6$.

The other logic modules 14 through 18 operate in the same manner as just described for logic module 13, the input connections being changed to effect the detection of different signal sequences.

I claim:

1. A decoding circuit for detecting a predetermined sequence of first, second and third signals, each of said signals being capable of having first and second states, said circuit comprising:
   - first, second and third input means for receiving first, second and third input signals respectively;
   - fourth input means for receiving the complement of the third input signal;
   - a thyristor having first and second current path electrodes and a gate electrode, the first electrode of the thyristor being coupled to said first input means;
   - first coupling means for coupling the gate electrode of said thyristor to the second input means;
   - second coupling means for coupling the second current path electrode of said thyristor to the third input means, said thyristor being rendered conductive by said first and second signals being in the first state and the third signal being in the second state, and
   - AND circuit means having first and second input terminals and an output terminal, the first input terminal of the AND circuit means being coupled to the second current path electrode of the thyristor, the second input terminal of the AND circuit means being coupled to the second and fourth input means, said AND circuit means providing a low impedance path between the first input terminal and the output terminal when the second input signal is in the second state and the complement of the third input signal is in the second state.

2. The circuit of claim 1 wherein said AND circuit means includes:
   - a transistor having first and second current conducting electrodes and a control electrode, the first and second current conducting electrodes being coupled to the first input terminal and the output terminal respectively; and
   - an OR circuit connected between the control electrode of said transistor and the second and fourth input means.

3. The circuit of claim 2 wherein said first coupling means includes a capacitor coupled between the gate electrode and the second input means.

4. The circuit of claim 3 wherein sad second coupling means includes a unilateral current conducting device connected between the second current path electrode of the thyristor and the third input means, and said circuit further including:
   - a first resistor connected between the gate electrode and the second current path electrode of the thyristor,
   - a second unilateral current conducting device connected between the second current path electrode of the thyristor and the first current conducting electrode of said transistor, said first and second unilateral current conducting devices being poled to pass current in the same direction as the thyristor.

5. The circuit of claim 4 wherein said OR circuit includes a third unilateral current conducting device coupled between the second input means and the control electrode of the transistor and poled to conduct current opposite the base current of the transistor and said OR circuit further including a second resistor coupled between the control electrode of the transistor and the fourth input means.